United States Patent [19]

Paulsen

[11] Patent Number: 4,681,410
[45] Date of Patent: Jul. 21, 1987

[54] FOLDABLE EYEGLASSES

[76] Inventor: Al W. Paulsen, 706 W. 8th, Gillette, Wyo. 82716

[21] Appl. No.: 744,533

[22] Filed: Jun. 14, 1985

[51] Int. Cl.⁴ .......................... G02C 5/08; G02C 5/14
[52] U.S. Cl. ....................................... 351/63; 351/119
[58] Field of Search .................................. 351/63, 119

[56] References Cited

U.S. PATENT DOCUMENTS 2,307,419 1/1943 McNeill et al. ............... 351/61 UX

FOREIGN PATENT DOCUMENTS 413653 5/1946 Italy ....................................... 351/41

Primary Examiner—Rodney B. Bovernick

[57] ABSTRACT

Foldable eyeglasses are disclosed that can be closed and stored in the form of a money clip. A pair of lenses are connected by a hinged bridge that allow the lenses to be folded together. Both temples of the eyeglasses are formed from a series of segments connected by hinges or pivots. In the open position, the segments are unfolded to form the temples and allow the eyeglasses to be worn by the user. In the closed position, the segments of each temple fold together to form the exterior side faces of the money clip, with the lenses folded and sandwiched between these exterior faces.

2 Claims, 5 Drawing Figures

FOLDABLE EYEGLASSES

BACKGROUND OF THE INVENTION

This invention pertains to the field of foldable eyeglasses. More specifically, the present invention discloses a pair of eyeglasses that can be folded and used as a money clip.

The prior art contains numerous examples of various types of folding eyeglasses and goggles, e.g. U.S. Pat. Nos. 2,814,968; 1,936,319; 2,275,999; 1,097,198; 1,915,707; 1,496,560; and 2,065,122. These references disclose various ways of folding eyeglass frames to make them more compact, or easier to carry or store. However, none of these references teaches or suggests a configuration that will allow the folded glasses to be used as a money clip.

SUMMARY OF THE INVENTION

The present invention is a foldable pair of eyeglasses that can be closed and stored in the form of a money clip. The bridge connecting the lenses serves as a hinge allowing the lenses to be folded together. The temples attached to the lenses consist of a series of segments connected by hinges or pivots. In the closed position, the segments of each temple fold together to form the exterior side faces of the money clip, with the lenses folded and sandwiched between these exterior faces.

A primary purpose of the present invention is to provide a compact set of foldable eyeglasses. In the closed position, these eyeglasses may well be the most compact reading glasses ever made. A second advantage is that the folded eyeglasses can also be used as a money clip. In addition to added convenience, use as a money clip greatly reduces any chance that the eyeglasses will accidentally be lost or misplaced.

DETAILED DESCRIPTION OF THE INVENTION

Figure 1:
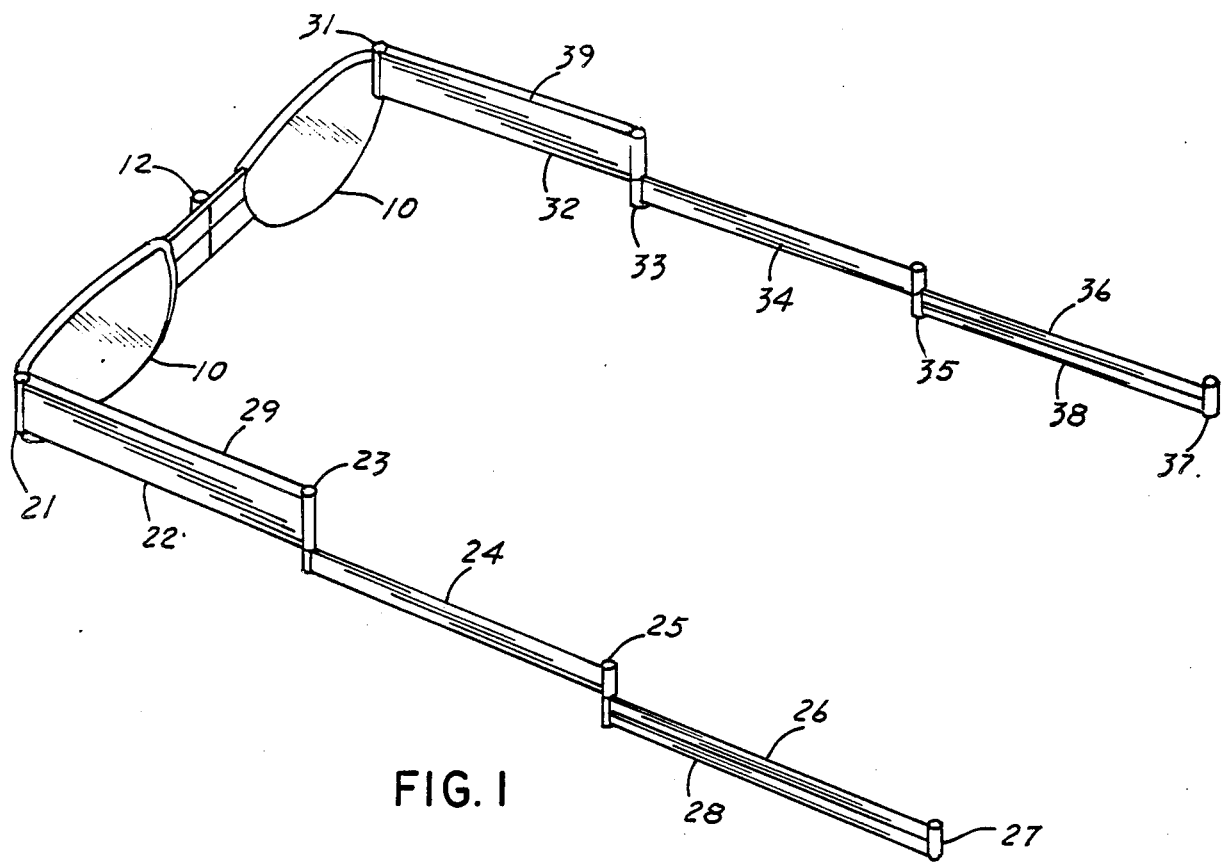
FIG. 1 is a perspective view showing one embodiment of the eyeglasses in an open position.
Figure 2:
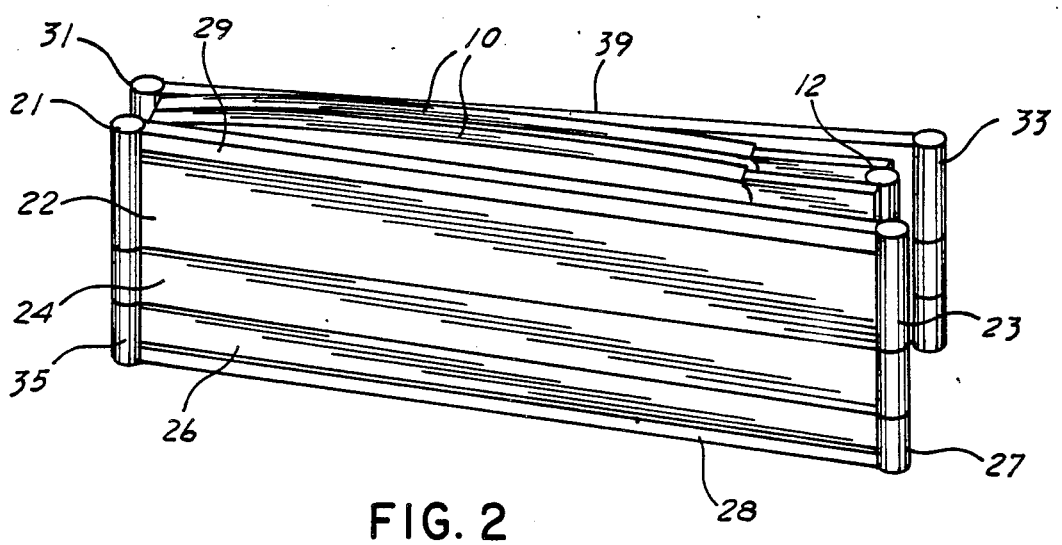
FIG. 2 is a perspective view showing the eyeglasses from FIG. 1 in a folded or closed position.
Figure 3:
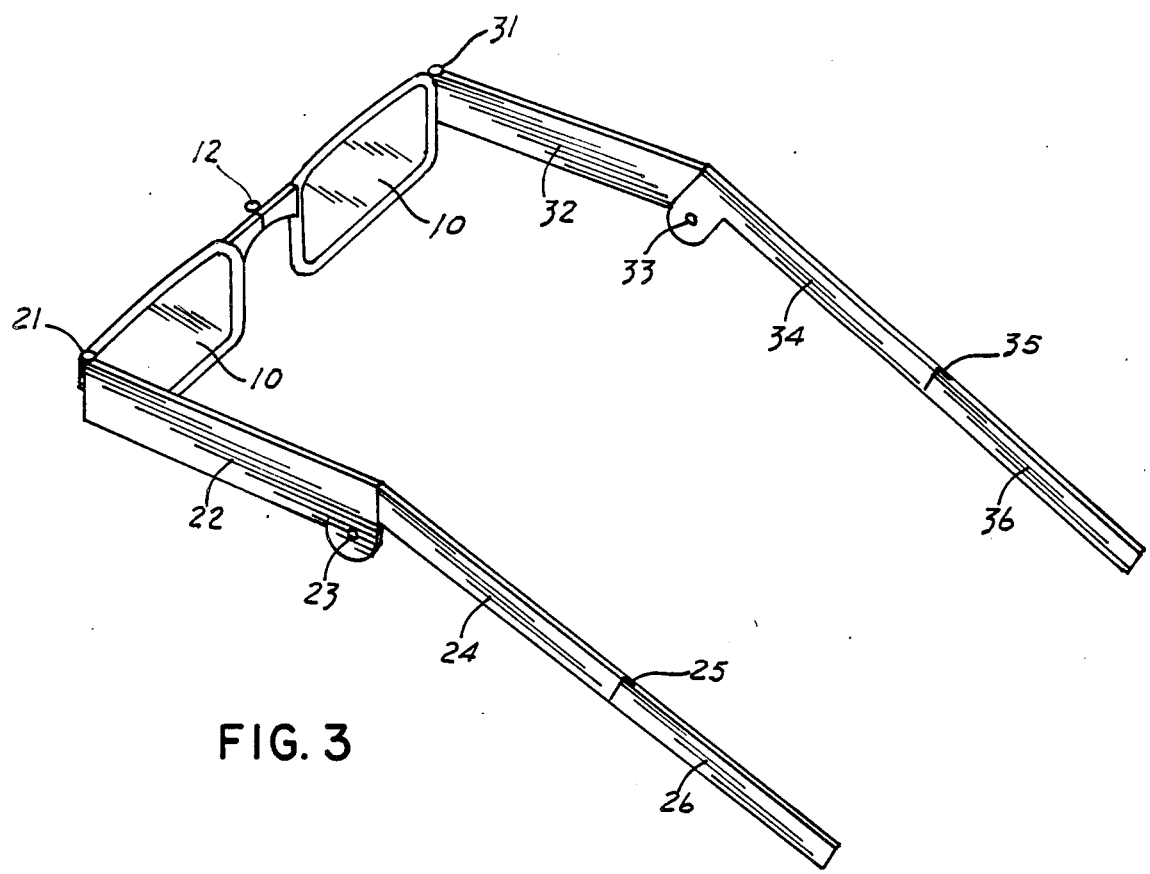
FIG. 3 is a perspective view showing a second embodiment of the eyeglasses in an open position.
Figure 4:
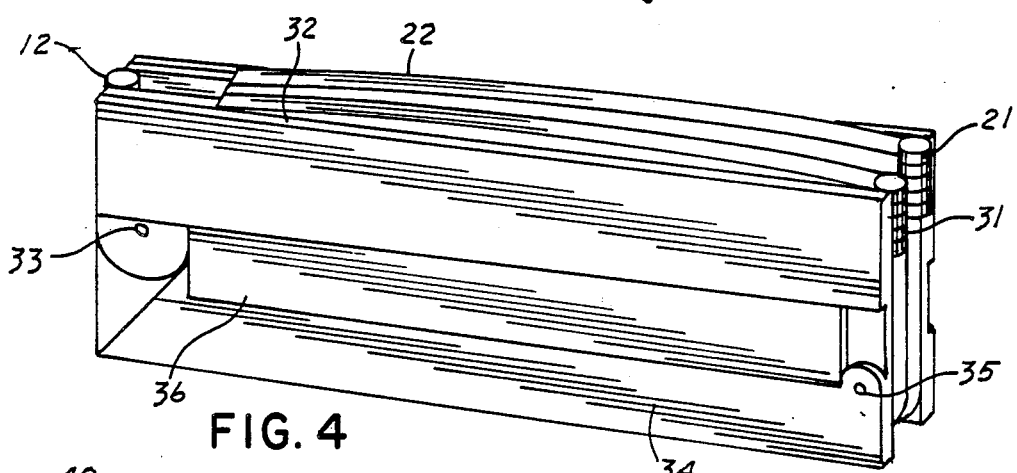
Fig. 4 is a perspective view showing the eyeglasses from FIG. 3 in a folded or closed position.

Turning to FIG. 1, one embodiment of the foldable eyeglasses is shown in perspective view in the open or unfolded position. A pair of lenses 10 are connected by a hinged bridge 12. The temples are attached to the lateral sides of the lenses by hinges 21 and 31, in a manner similar to conventional eyeglasses. However, instead of a conventional one-piece temple, each temple consists of a series of short segments (22, 24, 26 and 32, 34, 36) connected by hinges (23, 25 and 33, 35). In the embodiment shown in FIGS. 1 and 2, the hinges provide a vertical offset between each of the temple segments. As a result, the temple segments stack vertically in the folded position, as shown in FIG. 2, to form the exterior faces of the money clip. The hinges 21 and 25 and 31 and 35 vertically align in the folded position to each form one of the lateral edges of the money clip. Small sections of tubing 27 and 37 are attached at the end of segments 26 and 36. These sections of tubing vertically align with the remaining hinges 23 and 33 to form the other two lateral edges of the money clip. The hinges may be spring loaded and/or indexed to hold the temples in the open position. Matching indents and detents on the tops and bottoms of the hinges hold the segments in the closed position. Additionally strips of molding 29, 39, 28 and 38 are attached to the top and bottom segments on both faces of the money clip to conceal the lenses sandwiched between the faces of the money clip.

Figure 5:
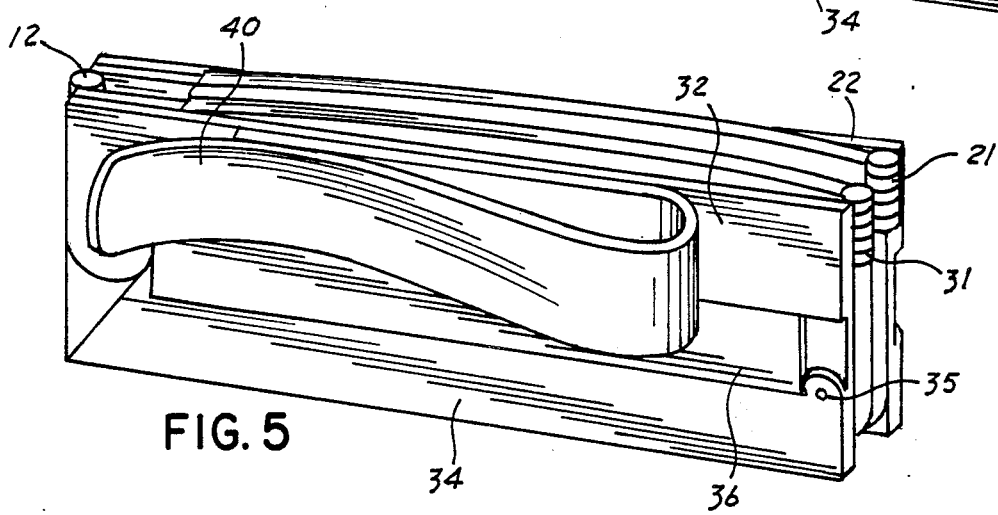
FIG. 5 is a perspective view showing the eyeglasses from FIG. 4 with an added clip attached to the side of the assembly.

When used as a money clip, currency is inserted between the folded lenses from the end opposite the hinged bridge 12. To hold the currency in place, the hinged bridge may be spring loaded. In that event, the hinged bridge should also be provided with a catch or some other locking mechanism to hold the lenses in proper position when opened for use as eyeglasses. FIGS. 2 through 5 show a second embodiment of the present invention. The primary difference between the embodiments is the manner in which the temple segments can be folded. Another difference involves the angle between the temple segments at the hinges 23 and 33. When worn as eyeglasses, the angle of the temples causes the lenses to tilt forward on the nose of the wearer (at an angle of approximately 15° from vertical) to make reading easier. FIG. 5 shows the same embodiment as FIG. 4 with an added clip 40 attached to the side face of the assembly.

I claim:

1. Foldable eyeglasses comprising:
   (a) A pair of lenses connected by a hinged bridge allowing the lenses to open to a position suitable for use as reading glasses, and to close to a position such that the front surfaces of the lenses fold together;
   (b) Temples hingedly connected to the frames of said lenses, each temple comprising a number of foldable segments connected by hinges so that in the folded position the segments stack vertically to form one exterior face of the folded assembly, with the lenses entirely covered and folded between the exterior faces.

2. The foldable eyeglasses of claim 1, further comprising edge molding on those edges of the temple segments forming the periphery of the exterior faces; said molding extending inwardly and having a width sufficient to span the gap between the exterior faces about the periphery of the folded assembly.

* * * * *